United States Patent
Shen

(10) Patent No.: US 6,578,671 B2
(45) Date of Patent: Jun. 17, 2003

(54) METHOD AND SYSTEM FOR THE AUTOMATED EXCHANGE OF MERCHANDISE

(76) Inventor: Raymond Shen, 2600 E. 8th St., Los Angeles, CA (US) 90023

( * ) Notice: Subject to any disclaimer, the term of this patent is extended or adjusted under 35 U.S.C. 154(b) by 219 days.

(21) Appl. No.: 09/739,389

(22) Filed: Dec. 18, 2000

(65) Prior Publication Data

US 2002/0077938 A1 Jun. 20, 2002

(51) Int. Cl.$^7$ .............................. B61B 3/00; B65G 3/00; E04H 3/00
(52) U.S. Cl. .......................... 186/53; 700/216; 700/225; 700/226; 186/35; 186/36; 186/41
(58) Field of Search ................................. 700/213, 225, 700/226, 227; 186/53, 41, 35, 36

(56) References Cited

U.S. PATENT DOCUMENTS

| | | | | |
|---|---|---|---|---|
| 2,788,822 A | * | 4/1957 | Parker | 206/554 |
| 3,027,022 A | * | 3/1962 | Peras | 198/349.7 |
| 3,504,245 A | * | 3/1970 | Cotton et al. | 318/569 |
| 4,237,598 A | * | 12/1980 | Williamson | 29/26 A |
| 4,735,289 A | * | 4/1988 | Kenyon | 109/19 |
| 4,803,348 A | * | 2/1989 | Lohrey et al. | 235/375 |
| 4,991,719 A | * | 2/1991 | Butcher et al. | 198/349.95 |
| 5,025,140 A | * | 6/1991 | Varley | 235/381 |
| 5,113,351 A | * | 5/1992 | Bostic | 235/381 |
| 5,113,974 A | * | 5/1992 | Vayda | 186/36 |
| 5,305,197 A | * | 4/1994 | Axler et al. | 700/234 |
| 6,010,239 A | * | 1/2000 | Hardgrave et al. | 700/213 |
| 6,233,399 B1 | * | 5/2001 | Walter | 396/2 |
| 6,324,437 B1 | * | 11/2001 | Frankel et al. | 33/11 |
| 6,405,100 B1 | * | 6/2002 | Christ | 414/270 |
| 6,439,345 B1 | * | 8/2002 | Recktenwald et al. | 186/55 |

* cited by examiner

Primary Examiner—Donald P. Walsh
Assistant Examiner—Jeffery A Shapiro
(74) Attorney, Agent, or Firm—Michael I Kroll

(57) ABSTRACT

A method and system for automatic drop off and pick up of merchandise on which service is desired. The system includes a processing device for input of data related to merchandise to be dropped off, a drop off section for receiving the merchandise being dropped off and retaining the merchandise for performing the desired service and a pick up section for storing the merchandise after the desired service has been performed and returning the merchandise to the customer upon receipt of payment by the means for receiving the claim ticket. The processing device includes a data input module for receiving data from a customer relating to the type of merchandise being dropped off, amount of merchandise being dropped off and a desired service to be performed on the merchandise, a printer for providing a claim ticket including the data received from the customer and a unique code identifying the merchandise being dropped off printed thereon and a device for receiving the claim ticket and payment for the desired services. The data input module includes a processor and a touch screen, the touch screen is controlled by the processor to display options from which the customer enters the data related to the merchandise. The receiving device scans the code on the claim ticket and provides the scanned code to the processor for analysis. The merchandise is placed in a bag and placed within a drop off window. The serviced merchandise is retrieved through a pick up window.

13 Claims, 10 Drawing Sheets

METHOD AND SYSTEM FOR THE AUTOMATED EXCHANGE OF MERCHANDISE

BACKGROUND OF THE INVENTION

1. Field of the Invention

The present invention relates generally to methods and systems for merchandise exchange and, more specifically, to a system for automatically receiving merchandise from a customer and providing an automated pick up of the merchandise for the customer without the requirements and drawbacks associated with manual transactions.

2. Description of the Prior Art

Numerous types of systems for the drop off and pick up of merchandise with a merchant have been provided in the prior art. These systems and methods concentrated on the organization and marking of the merchandise dropped off by each Customer. Such a system is illustrated in FIG. 1. FIG. 1 illustrates a conventional dry cleaning shop indicated by the numeral 10. Within this shop 10 is a clerk or employee 12 for receiving merchandise 16 dropped off by customers 14 for cleaning. When merchandise 16 is dropped off by a customer 14, such as dry cleaning or items brought to a merchant for repair, the item must be clearly marked so as not to get mixed up with the merchandise of another customer. The know methods are labor intensive and require employees for processing the transactions. When accepting an item of merchandise 16 from a customer 14, the clerk 12 must prepare a receipt 18 indicating the number of garments and type of garments being dropped off by the customer 14. The receipt 18 is generally within a pad positioned on the counter 19 behind which the clerk 12 is standing. The clerk 12 must also mark the merchandise 16 with an identification code such as a number which is also displayed on the receipt 18. Thus, when the customer 14 returns with the receipt 18, the merchandise 16 can be identified and returned in a repaired and/or cleaned state. The garments 22 which have been cleaned and/or repaired are generally positioned on a rack 20 behind the clerk 12 so that they may be readily retrieved when the customer 14 comes by to pick them up. These methods and systems are labor intensive and are also dependent on the use of a manual labor force. Thus, the hours of operation for a business using such a system is dependent on both economics and the availability of labor. The business can only operate during hours in which employees are available to work and can only obtain employees if the business is successful enough to pay the going rate for such employees. Thus, the hours of operation are restricted by the amount of money the business can allocate for salaries and the hours during which the business can find employees to perform the tasks necessary to operate the business. While these units may be suitable for the particular purpose to which they address, they would not be as suitable for the purposes of the present invention as heretofore described.

It is thus desirable to provide a method and system for the automated exchange of merchandise which is not dependent on a manual workforce. It is further desirable to provide a method and system for the automated exchange of merchandise which is able to cater to the needs of customers without additional expense. It is yet further desirable to provide a method and system for the automated exchange of merchandise which is able to provide service to customers at all hours without both the need for a manual workforce to oversee the operation and the costs associated with the manual workforce. It is still further desirable to provide a method and system for the automated exchange of merchandise which is able to provide an automatic drop off point for merchandise and a printed receipt for the customer to use in retrieving the merchandise when ready. It is even further desirable to provide a method and system for the automated exchange of merchandise which is able to provide an automatic pick-up point for retrieving the merchandise by a customer at any desired time. It is yet further desirable to provide a method and system for the automated exchange of merchandise which is able to provide a customer with numerous options for payment when retrieving merchandise.

SUMMARY OF THE PRESENT INVENTION

The present invention relates generally to methods and systems for merchandise pick up and drop off transactions and, more specifically, to a system for automatically receiving merchandise from a customer and providing the customer with a pick up point for the merchandise without the requirements and drawbacks associated with manual transactions.

A primary object of the present invention is to provide a method and system for exchange of merchandise that will overcome the shortcomings of prior art devices.

Another object of the present invention is to provide a method and system for automated exchange of merchandise which is able to provide an automated location for a user to drop off merchandise that is able to receive merchandise at all times.

A further object of the present invention is to provide a method and system for automated exchange of merchandise wherein the customer is provided with a claim ticket identifying the merchandise upon drop off.

A still further object of the present invention is to provide a method and system for automated exchange of merchandise including a processing center for input of information concerning merchandise being dropped off and providing the claim ticket for such merchandise to the customer.

A yet further object of the present invention is to provide a method and system for automated exchange of merchandise wherein the processing center accounts for receipt of payment from a customer upon pick up of the merchandise.

An even further object of the present invention is to provide a method and system for automated exchange of merchandise wherein the claim ticket provided by the processing center includes an identification number for correlating the claim ticket and merchandise dropped off by the customer.

Another object of the present invention is to provide a method and system for automated exchange of merchandise wherein the processing center is accessible 24 hours a day for a customer to pick up and drop off merchandise.

A yet object of the present invention is to provide a method and system for automated exchange of merchandise that is simple and easy to use.

A still further object of the present invention is to provide a method and system for automated exchange of merchandise that is economical in cost to manufacture.

A method and system for automatic drop off and pick up of merchandise on which service is desired is disclosed by the present invention. The system includes a processing device for input of data related to merchandise to be dropped off, a drop off section for receiving the merchandise being dropped off and retaining the merchandise for performing the desired service and a pick up section for storing the merchandise after the desired service has been performed and returning the merchandise to the customer upon receipt of payment by the means for receiving the claim ticket. The processing device includes a data input module for receiving data from a customer relating to the type of merchandise being dropped off, amount of merchandise being dropped off and a desired service to be performed on the merchandise, a printer for providing a claim ticket including the data received from the customer and a unique code identifying the merchandise being dropped off printed thereon and a device for receiving the claim ticket and payment for the desired services. The data input module includes a processor and a touch screen, the touch screen is controlled by the processor to display options from which the customer enters the data related to the merchandise. The receiving device scans the code on the claim ticket and provides the scanned code to the processor for analysis. The merchandise is placed in a bag and placed within a drop off window. The serviced merchandise is retrieved through a pick up window.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
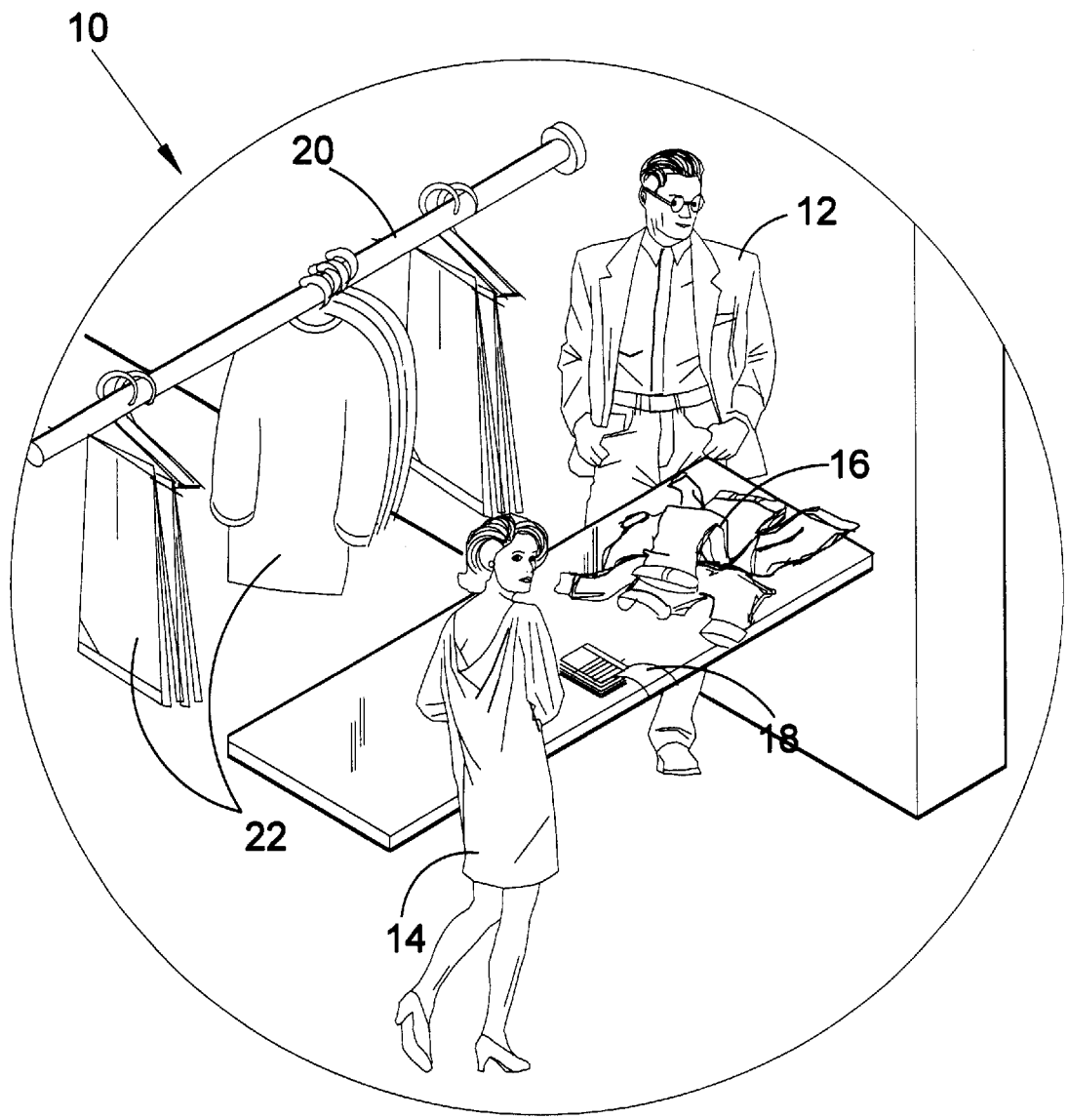
FIG. 1 is a top perspective view of a conventional dry cleaning shop with a merchant manually accepted clothes to be cleaned from a customer and manually preparing a receipt for the clothes.

Turning now descriptively to the drawings, in which similar reference characters denote similar elements throughout the several views, the Figures illustrate the method and system for automated exchange of merchandise of the present invention. With regard to the reference numerals used, the following numbering is used throughout the various drawing figures.

10 conventional dry cleaning establishment
12 merchant
14 customer
16 clothes being dropped off by customer
18 receipt for clothes
19 counter
20 rack retaining clothes to be picked up by customers
22 clothes on rack
23 structure
24 system for automated exchange of merchandise of the present invention
26 glass enclosing system for automated exchange of merchandise
28 video surveillance camera
30 conveyor rack
32 delivery bar for providing items on rack for pick up
34 drop off window
36 pick up window
38 counter in front of glass for customer to lay clothes on
40 processing center
42 clothes on rack for pick up
44 rack for retaining clothes dropped off by customer
46 bag in which clothes dropped off are retained
48 additional bags for retaining clothes dropped off for each order
50 identification number for orders ready for pickup
52 identification number for orders dropped off
54 pick up bar for relaying dropped off orders to rack
56 touch screen for processing center
58 slot for receiving claim ticket
60 slot for receiving coins for payment
62 slot for receiving bills for payment
64 slot for receiving credit/debit cards for payment
66 change slot
68 claims ticket printer/pick up slot
70 processor
72 power source
74 claim ticket scanner
75 conveyor rack motor
76 transmitter for relaying credit/debit card information
78 receiver for receiving credit/debit card information
80 motor for rotating pick up rack
82 button for operating drop off rack
84 connection line between button and drop off rack 86 receipt
88 receipt identification number
89 list of the merchandise
90 price list for listed merchandise
92 total due for merchandise
94 bar code

DETAILED DESCRIPTION OF THE PREFERRED EMBODIMENT

Turning now descriptively to the drawings, in which similar reference characters denote similar elements throughout the several views, FIGS. 2 through 10 illustrate the method and system for exchange of merchandise of the present invention indicated generally by the numeral 24.

Figure 2:
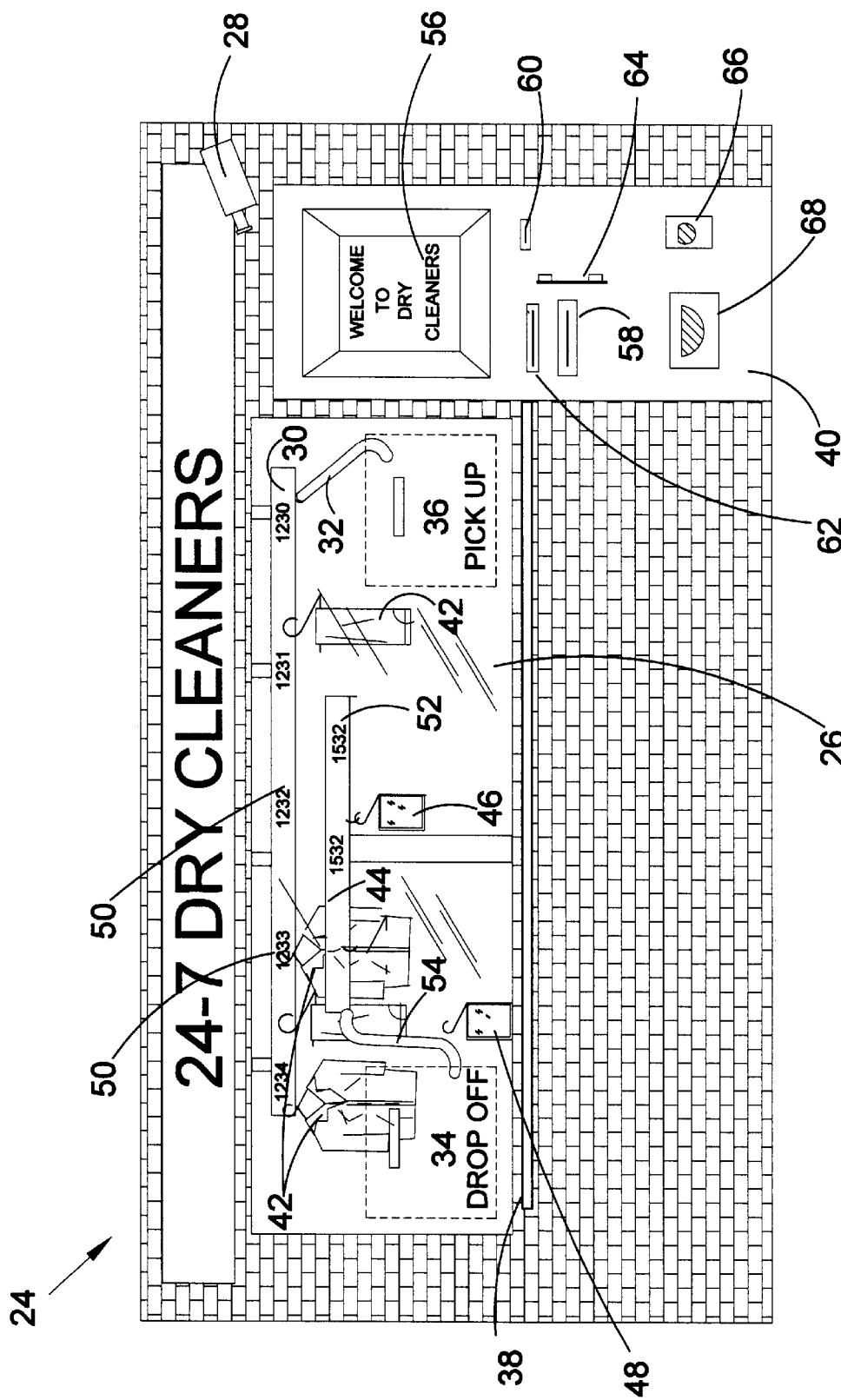
FIG. 2 is an enlarged top perspective view of the system for automated exchange of merchandise of the present invention.

The system for exchange of merchandise 24 is illustrated in FIG. 2. As can be seen from this figure, the system for exchange of merchandise 24 is provided within a structure 23 and preferably behind a transparent window 26. The transparent window 26 is preferably glass, plexiglass or any other material which is transparent and able to provide security for items within the structure 23. Also positioned within and surrounding the structure 23 are video surveillance cameras 28. The video surveillance cameras 28 provide additional security for the customer and provide a video record of merchandise dropped off by the customer thereby protecting the owner. A shelf 38 extends below the window 26 for a customer to rest merchandise being dropped off or other items being carried. A drop off window 34 and a pick up window 36 are provided in a side of the structure 23. The drop off window 34 is provided for receiving merchandise from a customer that requires cleaning and/or repair. The pick up window 36 is provided for receiving merchandise by the customer after cleaning and/or repair.

On a side of the structure is a processing center 40. The processing center 40 includes a touch screen 56 for entering information concerning the merchandise to be dropped off or picked up. Also provided in the processing center is a slot 58 for receiving a claim ticket upon pick up of merchandise, a slot 60 for receiving coin payments for the merchandise being picked up, a slot 62 for receiving bill payments for the merchandise being picked up and a slot 64 for receiving a credit/debit card payment for the merchandise being picked up. Also provided in the processing center 40 is a slot 66 for return of change due to overpayment and a slot 68 for receiving a claim ticket upon drop off of merchandise.

Positioned within the structure 23 and adjacent the drop off window 34 are bags 48 in which merchandise being dropped off is placed. The bags 48 are positioned on a pick up bar 54. The pick up bar 54 is connected to a rack 44 for retaining the merchandise being dropped off. Upon placing the merchandise in the bag 54 and activating the system to indicate the dropping off of merchandise, the bag 48 will be delivered to the rack 44 via the pick up bar 54. Indicia 52 is strategically positioned along the length of the rack 44 to identify each bag 48 including merchandise therein. The indicia 52 is associated with a number and bar code printed on a claim ticket provided to each customer when dropping off merchandise.

Also positioned within the structure 23 is an automated pick up conveyor rack 30 including a delivery bar 32 extending therefrom. Merchandise 42 which has been cleaned and/or repaired is positioned on the conveyor rack 30 in a desired location identified by an identification number 50 printed on the automated pick up conveyor rack 30. The identification number 50 is associated with the number and bar code on the claim ticket provided to the customer upon dropping off the merchandise. When picking up merchandise, the customer inserts the claim ticket into the slot 58. The processing center 40 reads the bar code on the claim ticket and rotates the conveyor rack 30 such that the merchandise associated with the claim ticket is positioned adjacent the delivery bar 32. The indicia 50 on the conveyor rack 30 is associated with the bar code on the claim ticket. Upon reading the bar code, the conveyor rack 30 is rotated to a desired position whereby the merchandise positioned on the conveyor rack 30 adjacent the corresponding and associated indicia 50 is positioned for delivery by the delivery bar 32. Upon alignment of the merchandise with the delivery bar 32 the merchandise on the conveyor rack 30 is delivered to the pick up window 36 via the delivery bar 32. The customer is now able to open the pick up window 36 and retrieve the merchandise.

Figure 3:
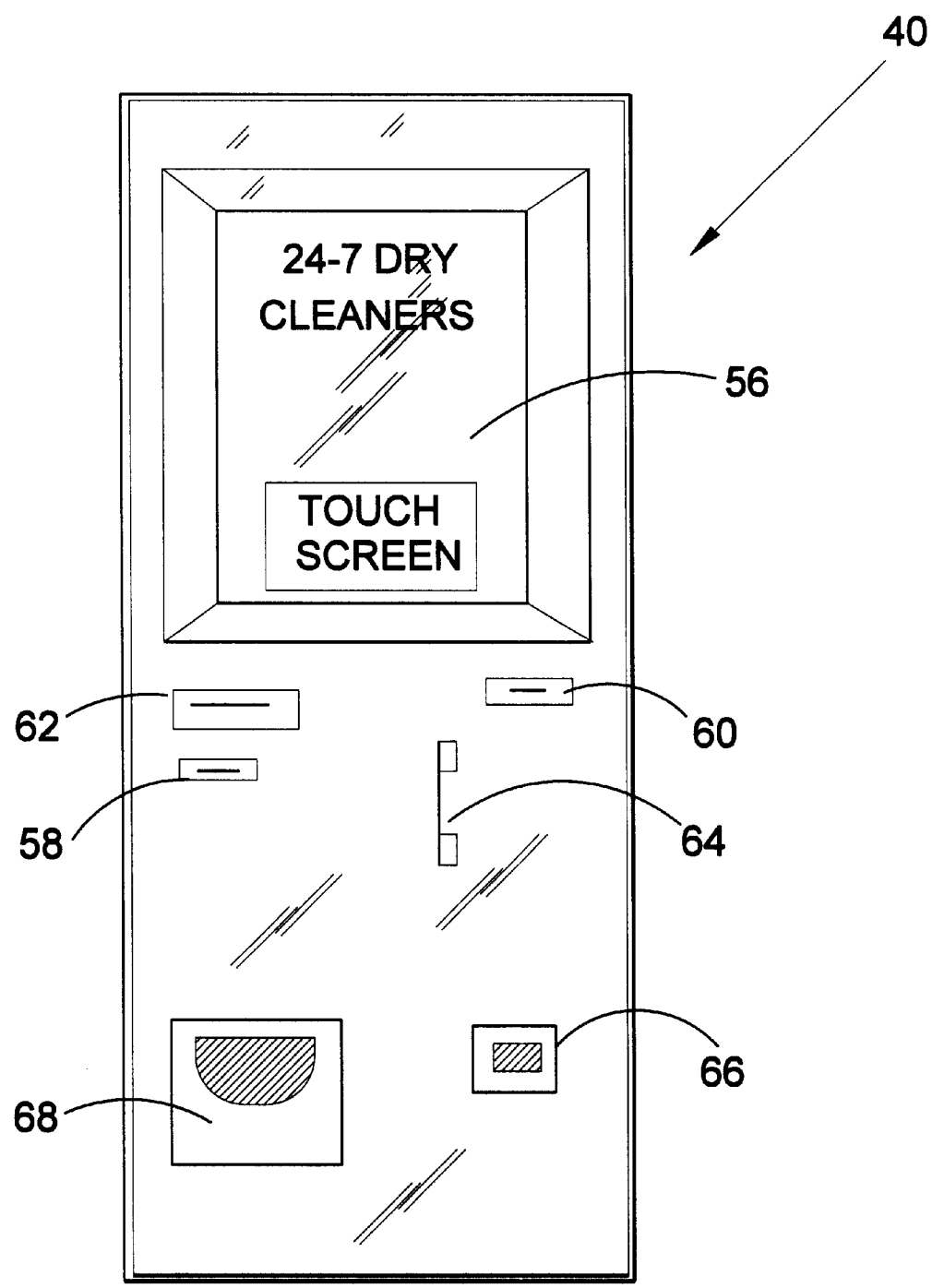
FIG. 3 is an enlarged perspective view of the processing center used in the system for automated exchange of the present invention.

An illustration of the processing center 40 is shown in FIG. 3. As can be seen from this figure, the processing center 40 includes a touch screen 56 for entering information concerning the merchandise to be dropped off or picked up. Also provided in the processing center is a slot 58 for receiving a claim ticket upon pick up of merchandise, a slot 60 for receiving coin payments for the merchandise being picked up, a slot 62 for receiving bill payments for the merchandise being picked up and a slot 64 for receiving a credit/debit card for payment. Also provided in the processing center 40 is a slot 66 for return of change due to overpayment and a slot 68 for providing a claim ticket to the customer upon drop off of merchandise. Upon dropping off of merchandise, the customer enters certain information on the touch screen 56. Such information includes the number and type of garments being dropped off and what service is desired for each item. Upon entering the information and dropping off the merchandise at the drop off window 34, a claim ticket is provided to the customer at the slot 68. The claim ticket indicates the items dropped off and includes a bar code thereon. The bar code is a unique identification code associated with the merchandise dropped off and used to identify the merchandise when being picked up. The claim ticket may additionally include the cost for cleaning and/or repairing the merchandise printed thereon. Upon picking up merchandise, the customer inserts the claim ticket into the slot 58. The processing center 40 reads the bar code information on the claim ticket and instructs the user to input the amount due into either the slot 60 for receiving coin payments, slot 62 for receiving bill payments or the slot 64 for receiving credit/debit card payments. Upon payment of the correct amount, the merchandise is retrieved from the conveyor rack 30 and provided to the pick up window 36 via the delivery bar 32. Any overpayment is returned to the customer through the slot 66 for return of change due to overpayment.

Figure 4:
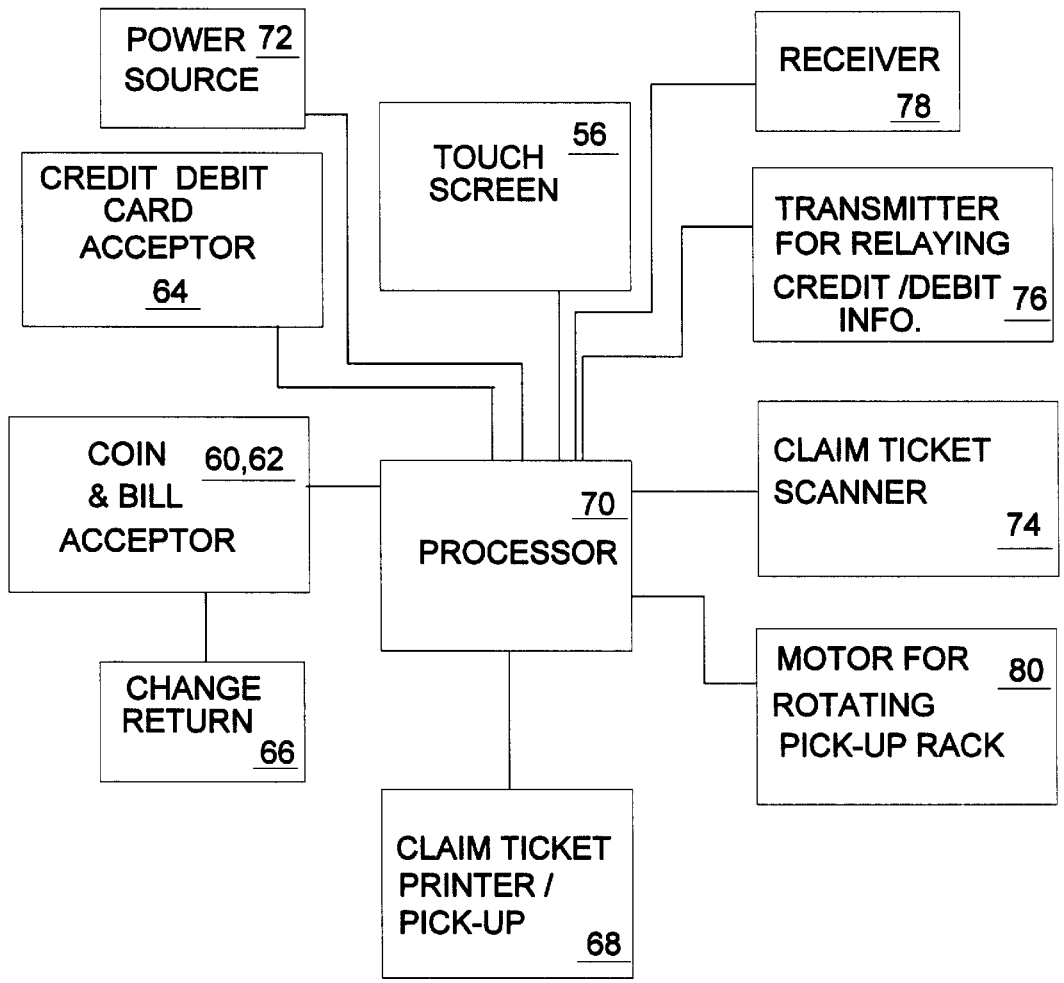
FIG. 4 is a block diagram illustrating the elements of the processing center of the system for automated exchange of merchandise of the present invention.

A block diagram of the processing center 40 is shown in FIG. 4. As can be seen from this figure, the processing center 40 includes a processor 70. The touch screen 56 is connected to the processor 70. The display on the touch screen 56 is controlled by the processor 70 and upon contact with a highlighted area on the touch screen 56 a signal indicating the highlighted area has been touched is sent to the processor 70. The processor 70 analyzes the signal and provides a subsequent display to the touch screen 56 including instructions on how to proceed. A power source 72 is provided within the structure 23 or the processing center 40 and connected to the processor 70 for providing power to the components of the processing center 40. A printer 68 is connected to the processor 70 for printing a claim ticket upon dropping off of merchandise and entry of the necessary information. A claim ticket scanner 74 is connected to the processor 70 for reading a bar code on a claim ticket inserted therein and providing the scanned bar code to the processor 70 for analysis. The processor 70 is connected to the conveyor rack motor 75 for rotating the conveyor rack 30 to a desired position based upon the scanned bar code.

Upon reading the bar code, the processor 70 controls the touch screen to provide a display indicating the amount due. The customer is then able to pay in cash or with a credit card. The coin and bill acceptors 60 and 62 are connected to the processor 70 which monitors the amount of money inserted therein by the customer. Once the processor 70 determines that the correct amount has been inserted, the processor controls the conveyor rack 30 and delivery bar 32 to provide the merchandise to the pick up window 36. Should the customer input too much money, the processor 70 controls the coin and bill acceptors 60 and 62 to return change through the change return 66. The customer can also insert a credit or debit card into the slot 64 for receiving a credit/debit card for payment. Upon insertion of the credit or debit card, the slot 64 for receiving a credit/debit card for payment contacts the processor 70 and sends a signal including the credit or debit card number. Upon receipt of the number, the processor activates a transmitter 76 connected thereto and transmits the credit or debit card number to the proper location for approval of payment. The transmitter 76 may be a connection to a telephone line or may be a cellular telephone whereby the information is transmitted over the public switched telephone network. A receiver 78 is also connected to the processor 70 for receiving a return signal from the proper location indicating approval or denial of the credit or debit card transaction. Once the processor 70 receives an approval signal, the merchandise is provided to the pick up window 36.

Figure 5:
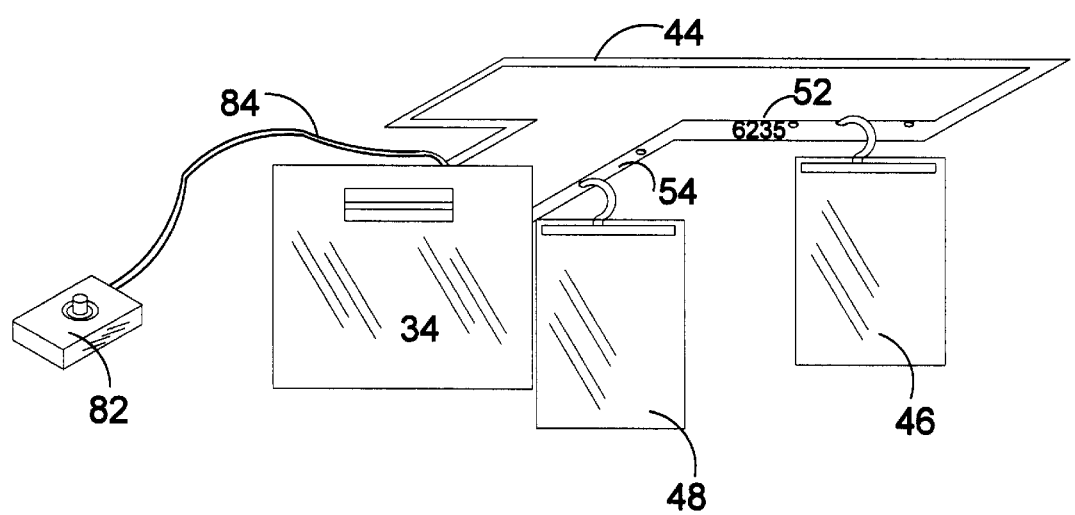
FIG. 5 is a block diagram illustrating the elements of the processing center enlarged perspective view of the drop off window of the system for automated exchange of merchandise of the present invention.

An enlarged view of the drop off portion of the system for exchange of merchandise 24 is shown in FIG. 5. As can be seen from this figure, the drop off portion of the system for exchange of merchandise 24 includes the rack 44 for retaining merchandise which has been dropped off and the pick up bar 54 connected thereto. The pick up bar 54 extends from the rack 44 to the pick up window 34 and includes bags 48 for receiving dropped off merchandise thereon. Connected to operate the rack 44 through a connection wire 84 is a control button 82. The control button 82 is activated upon insertion of the merchandise into a bag 48. When the control button 82 is activated, the rack 44 is caused to rotate thereby moving the bag 48 which has just been filled away from the drop off window 34. The rack 44 includes indicia 52 printed thereon to identify the bag 48 positioned thereunder. The indicia 52 on the rack 44 is associated with the bar code printed on the claim ticket provided to the customer. A filled bag 46 is shown on the rack 44 positioned away from the drop off window 34. Additional empty bags 48 are provided adjacent the drop off window 34 for receiving merchandise from subsequent customers.

Figure 6:
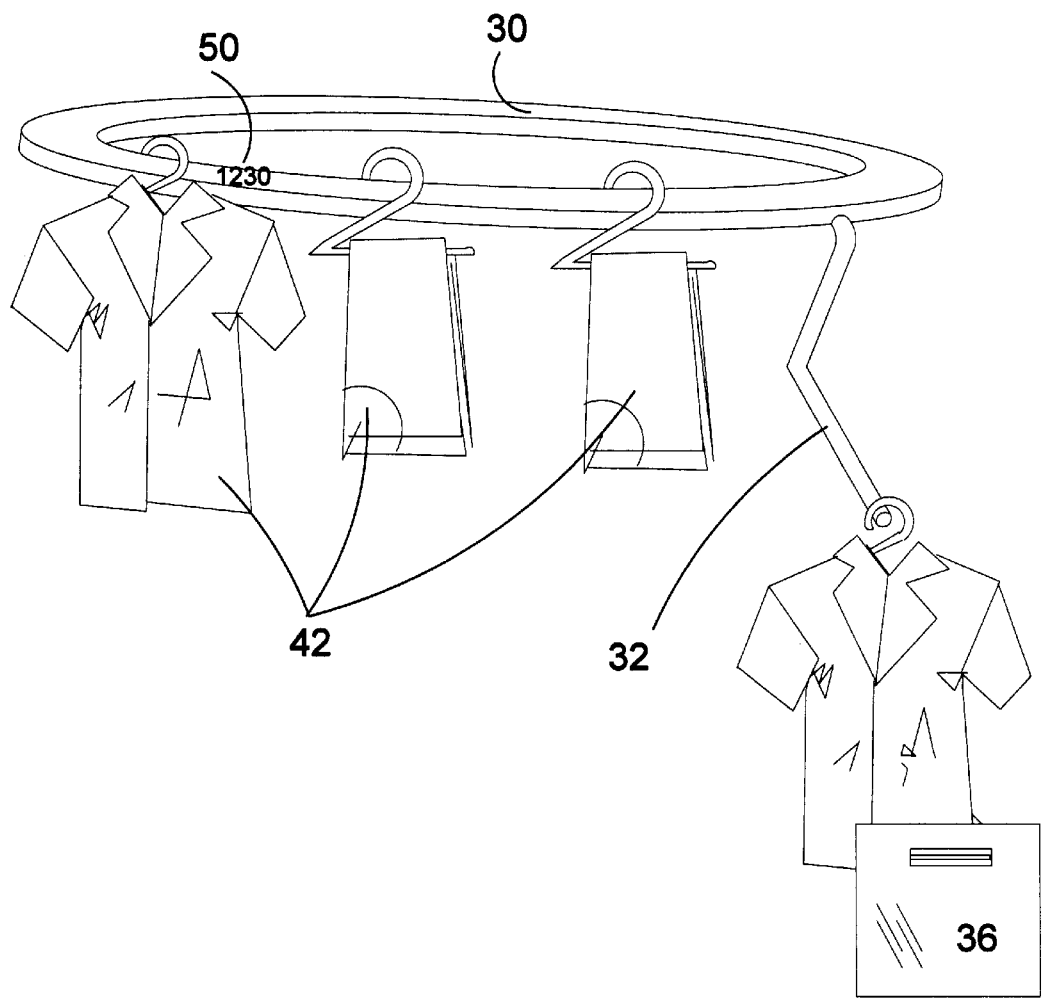
FIG. 6 is a perspective view of the pick up window of the system for exchange of merchandise of the present invention including a paint can hanging on the retaining device.

An enlarged view of the pick up portion of the system is illustrated in FIG. 6. As can be seen from this figure, the pick up portion of the system includes the conveyor rack 30 and delivery bar 32 connected thereto. The delivery bar 32 leads from the conveyor rack 30 to the pick up window 36. When the merchandise 50 is ready for pick up, it is positioned on the conveyor rack 30 adjacent indicia 50 identifying the merchandise 42. Upon the customer inputting the money due, the conveyor rack 30 is controlled by the processor 70 to rotate and position the customers merchandise 42 adjacent the delivery arm 32. The delivery arm 32 directs the merchandise 50 to the pick up window 36 where it is retrieved by the customer.

Figure 9:
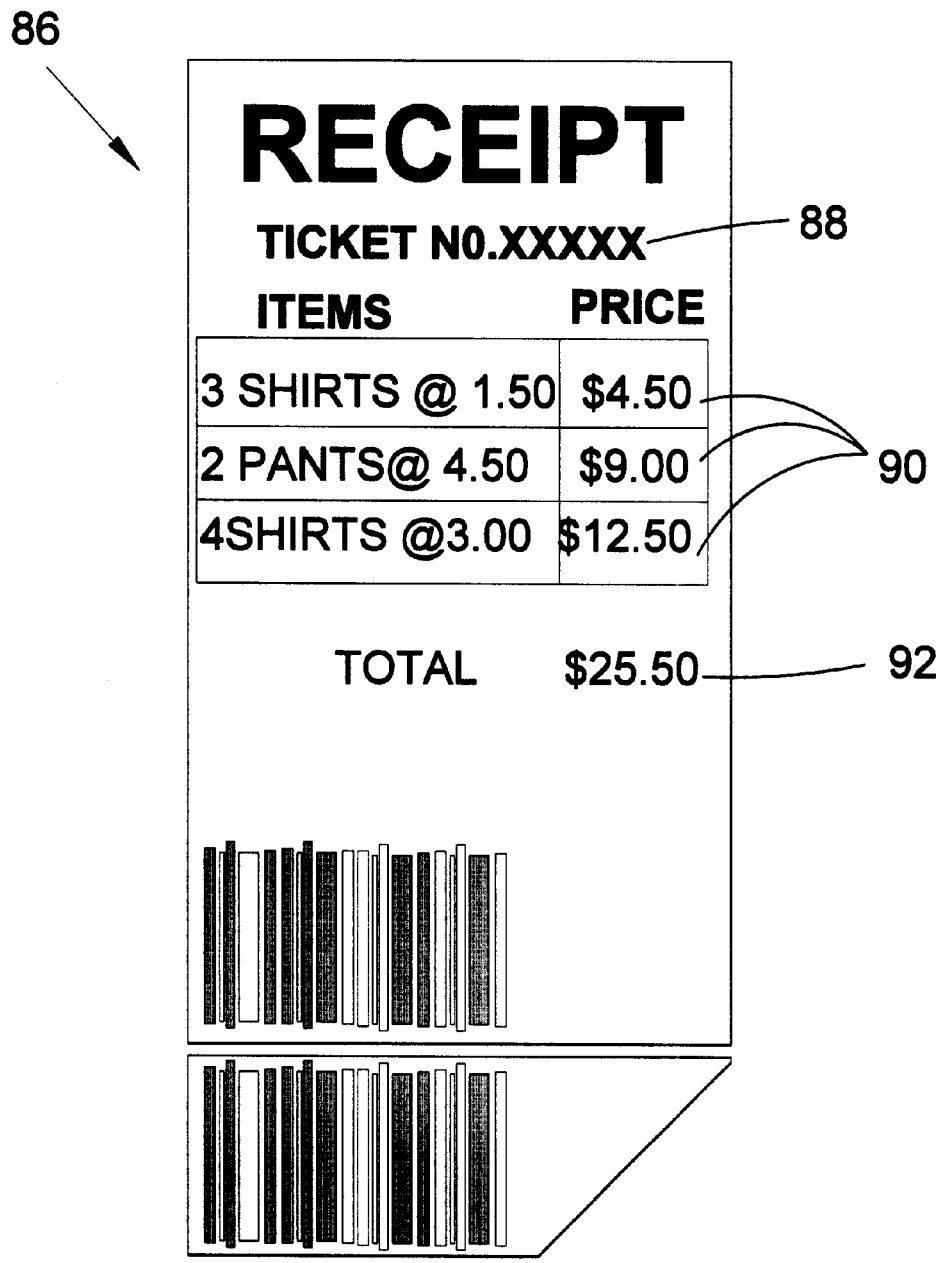
FIG. 9 is a perspective view of a receipt provided by the processing center of the system for automated exchange of merchandise of the present invention.

A view of an exemplary claim ticket 86 is illustrated in FIG. 9. As can be seen from this figure, the claim ticket 86 includes a ticket number 88 and a list of the merchandise 89 dropped off. Adjacent each item in the merchandise list 89 is a price for the item 90. Below the list of prices 90 is a total amount due 92 for the entire order. Also provided on the claim ticket 86 is a bar code 94. The bar code 94 is used to identify the merchandise for pick up and associate the claim ticket 86 with a particular set of merchandise so that the order is not delivered to the wrong customer.

Figure 7:
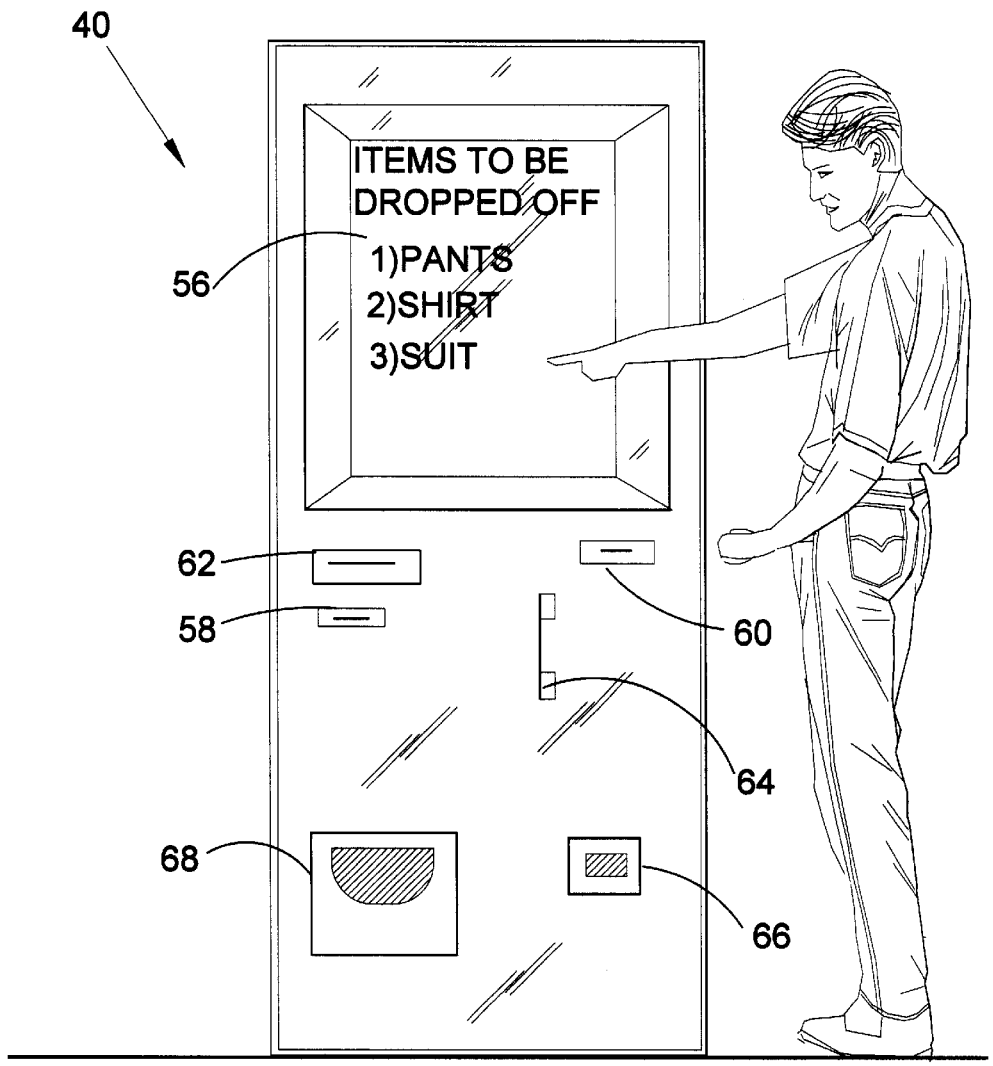
FIG. 7 is a perspective view of a person using the processing system of the system for automated exchange of merchandise of the present invention to drop off merchandise.
Figure 8:
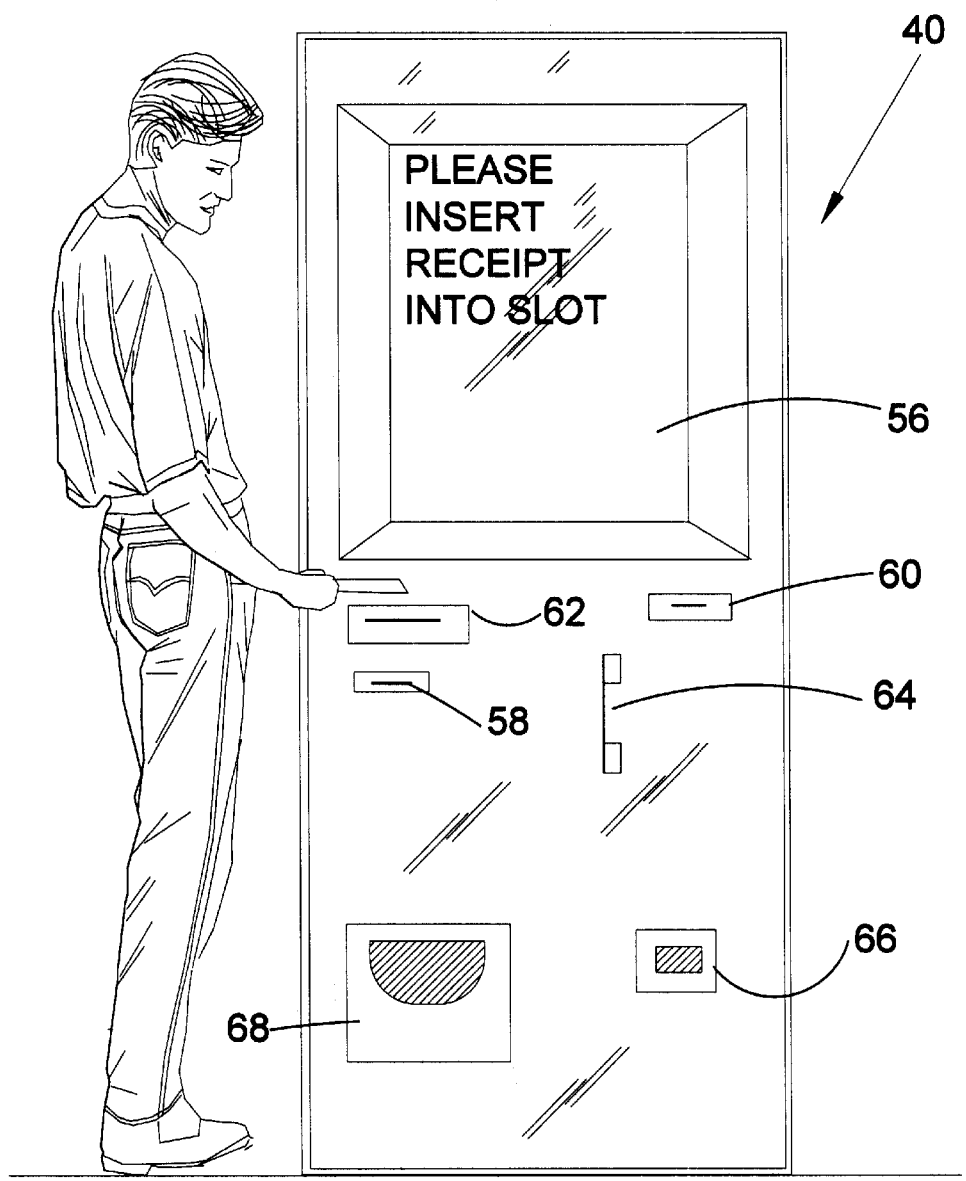
FIG. 8 is a perspective view of a person using the processing system of the system for automated exchange of merchandise of the present invention to pay for and pick up merchandise.
Figure 10:
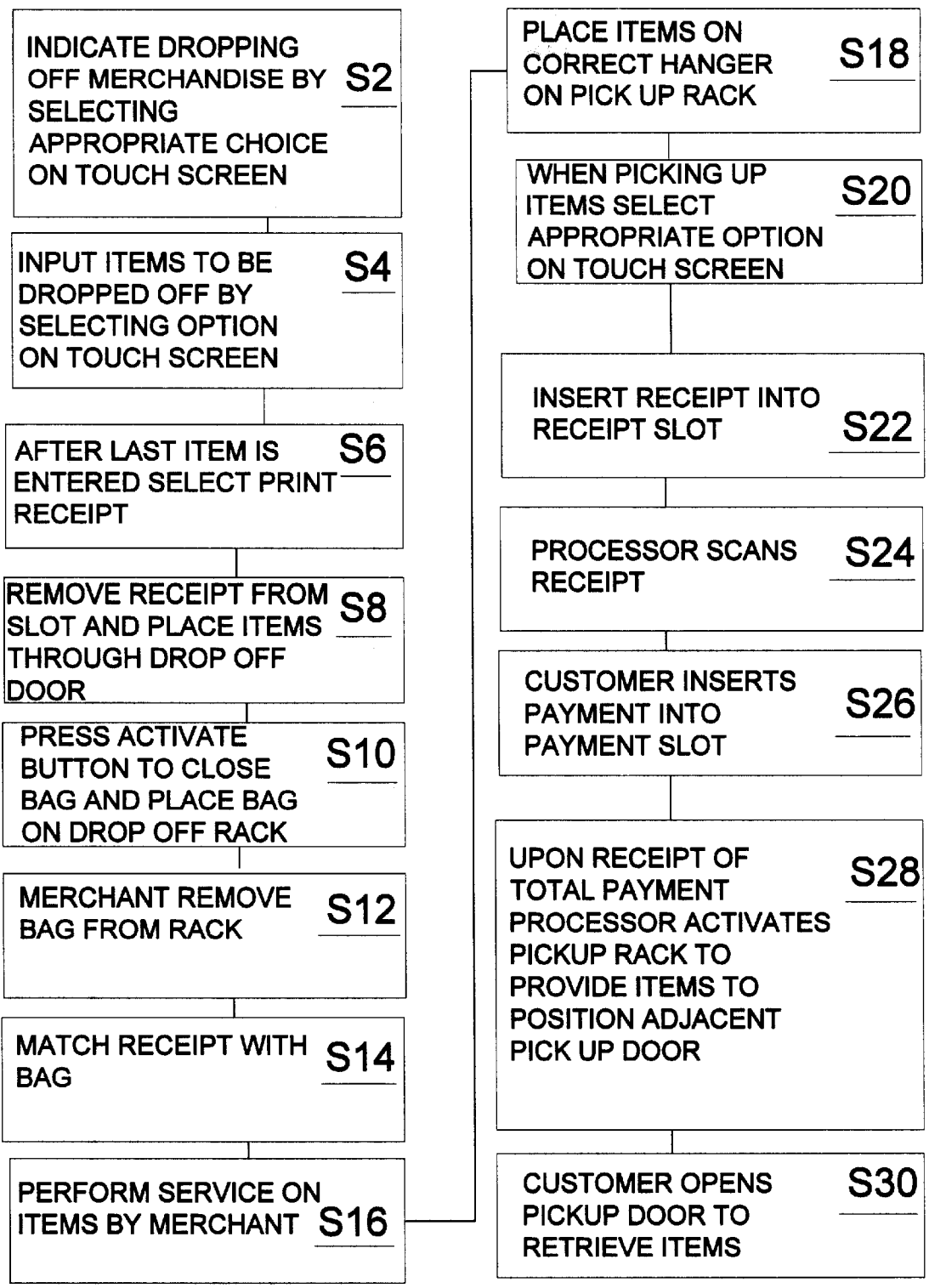
FIG. 10 is flow chart illustrating the method for automated exchange of merchandise of the present invention.

The operation of the method and system for exchange of merchandise 24 will now be described with reference to the figures and specifically FIGS. 7, 8 and 10. In operation, the method and system for exchange of merchandise 24 is used to provide 24 hour service for persons to drop off and pick up merchandise. When it is desired to drop off merchandise, the customer approaches the processing unit 40 and selects the dropping off merchandise option on the touch screen as discussed in step S2. Upon selecting the drop off merchandise option, the processor 70 provides a display on the touch screen 56 allowing the customer to select the items being dropped off as stated in step S4 and shown in FIG. 7. FIG. 7 illustrates a customer selecting the items to be dropped off for cleaning and/or repair. As can be seen, the touch screen 56 provides a display indicating a list of different potential items which may be dropped off. The list shown includes pants, shirts and suits. This list is shown for purposes of example only. However, additional items such as skirts, coats, comforters, etc. may be added to the list. In addition to entering the types of items, the customer also inputs the number of each item being dropped off, e.g. 4 shirts, 2 pants, 3 suits. After inputting the information concerning each item being dropped off, the user selects an option for printing a claim ticket as described in step S6. Once printed, the user removes the claim ticket from the slot 58 and places the merchandise through the drop off window 32 and into a bag 48 positioned therein as discussed in step S8. At this time, the activate button 82 is pressed and the filled bag 46 is closed and moved along the pick up bar 52 to a position on the rack 44 as stated in step S10. Throughout this transaction, the security cameras 28 are taping the activity surrounding the structure to assure that the transaction is legitimate and that the items entered on the touch screen are being placed in the bag 48.

When the merchant enters the structure the next day, the bags 46 are removed from the rack 44 and tagged by matching copies of the claim tickets with the bags as described in steps S12 and S14. The processing center 40 provides the merchant with a printout of each claim check upon demand. The merchant can then match the items within each bag with the information entered on the claim ticket. After checking the contents of the bags 46, the merchant performs the necessary service on the merchandise, e.g. cleaning and/or repairs, as discussed in step S16. Upon completion of the requested service, the merchant places the merchandise on the conveyor rack 30 at a position aligned with particular indicia 50. The indicia identifying each set of merchandise is entered into the processing center by the merchant so that the processing center is able to retrieve the associated merchandise when a claim ticket is provided and scanned as stated in step S18.

When it is desired to pick up merchandise, the customer selects the appropriate option on the touch screen 56 indicating that it is desired to retrieve merchandise as described in step S20. The touch screen is then controlled to provide a display instructing the customer to insert the claim check into the claim check slot 62 as discussed in step S22 and shown in FIG. 8. Upon insertion of the claim ticket 86, the processor 70 scans the bar code 94 thereon as stated in step S24. Upon scanning the bar code 94, the processor 70 determines the amount due for payment and displays the amount on the touch screen 56. The customer now enters payment in either the slot 60, slot 62 or slot 64 as described in step S26. Should the customer desire to pay in cash, the appropriate money is inserted into coin and bill acceptor slots 60 and 62. The coin and bill acceptor slots 60 and 62 are connected to the processor 70 which monitors the amount of money inserted by the customer. Should the customer input too much money, the processor 70 controls the coin and bill acceptors 60 and 62 to return change through the change return 66. The customer can also insert a credit or debit card into the slot 64 for receiving a credit/debit card for payment. Upon insertion of the credit or debit card, the slot 64 for receiving a credit/debit card for payment contacts the processor 70 and sends a signal including the credit or debit card number. Upon receipt of the number, the processor activates the transmitter 76 connected thereto and transmits the credit or debit card number to the proper location for approval of payment. The transmitter 76 may be a connection to a telephone line or may be a cellular telephone whereby the information is transmitted over the public switched telephone network. The receiver 78 is connected to the processor 70 for receiving a return signal from the proper location indicating approval or denial of the credit or debit card transaction. Once the processor 70 receives an approval signal, the transaction is allowed to continue.

Once the processor 70 determines that the correct amount has been inserted, the processor 70 activates the conveyor rack 30 and delivery bar 32 to provide the merchandise to the pick up window 36 as discussed in step S28. When the merchandise reaches the pick up window 36, the customer is able to open the pick up window 36 and retrieve the merchandise as stated in step S30.

From the above description it can be seen that the method and system for exchange of merchandise of the present invention is able to overcome the shortcomings of prior art devices by providing a method and system for exchange of merchandise which is able to provide an automated location for a user to drop off merchandise that is able to receive merchandise at all times, the processing center being accessible 24 hours a day for a customer to pick up and drop off merchandise. The system for automated exchange of merchandise includes a processing center for input of information concerning merchandise being dropped off and providing a claim ticket for such merchandise to the customer, the claim ticket including an identification number for correlating the receipt and merchandise dropped off by the customer. The system for automated exchange of merchandise also accounts for receipt of payment from a customer upon pick up of the merchandise. Furthermore, the method and system for exchange of merchandise of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A system for automatic drop off and pick up of articles of clothing on which service is desired, said system comprising:
   a) a building having an interface in an outer wall allowing customers to walk up to deposit said articles of clothing and to pick up said articles of clothing after said service is performed including means for input of data related to said articles of clothing to be dropped off, said input means including:
      i) a touch screen accessible from outside of said building for receiving data from a customer relating to the type and number of articles of clothing being dropped off and a desired service to be performed on said articles of clothing;
      ii) means for providing a claim ticket including the data received from the customer and a unique code identifying the articles of clothing being dropped off printed thereon;
      iii) a drop off window on a side of said building for receiving said articles of clothing, empty bags adjacent said drop window for receiving said articles of clothing and depositing inside of said building, each of said bags being attached to a clothes hanger, a pick up bar to receive each bag containing articles of clothing to be serviced, and a drop off rack to receive each bag containing said articles of clothing from said pick up bar, said drop off rack having indicia corresponding to said unique code issued on a corresponding claim ticket;
      iv) means for receiving the claim ticket and payment for the desired services after said articles of clothing are serviced;
   b) means for storing the articles of clothing after the desired service has been performed and returning the articles of clothing to the customer upon receipt of payment by the means for receiving the claim ticket;
   c) said means for storing and returning said articles of clothing after servicing comprising:
      i) an automated pick up rack located within said building adjacent said drop off rack, each article of clothing after servicing being supported on a hanger and suspended from said pick up rack at a location having unique indicia associated with the unique code on the associated claim ticket;
      ii) a delivery bar associated with said pick up rack for receiving the hanger on which said article of clothing has been serviced;
      iii) a pick up window through which said hanger supporting said article of clothing which has been serviced can be retrieved by a customer from said delivery bar, the dropping off of articles of clothing to be serviced and the later picking up of the serviced articles of clothing being accomplished without entering a building structure.

2. The system as recited in claim 1, wherein said input means includes a processor, said touch screen being controlled by said processor to display options from which the customer enters data related to the type of articles of clothing being dropped off and the desired service to be performed on the articles of clothing.

3. The system as recited in claim 2, wherein said means for receiving the claim ticket includes a printer connected to said processor for printing the claim ticket based upon the data input by the customer.

4. The system as recited in claim 3, wherein said means for receiving the claim ticket includes means connected to said processor for scanning the unique code printed on the claim ticket and providing a signal indicative of the scanned code to said processor.

5. The system as recited in claim 4, wherein said means for receiving the claim ticket further includes means for receiving coins and bills for payment and providing information concerning received coins and bills to said processor.

6. The system as recited in claim 5, wherein said means for receiving the claim ticket further includes means for receiving one of a credit and debit card for use in payment of an amount due for the desired services.

7. The system as recited in claim 6, wherein said input means controls said pick up rack to provide said bag associated with said unique code on a received claim ticket to the customer upon receipt of said claim ticket and payment by said means for receiving the claim ticket.

8. The system as recited in claim 7, further comprising video cameras positioned to monitor use of said system.

9. A method for automatic drop off and pick up of articles of clothing on which service is desired without entering a building structure, said method comprising the steps of:
   a) inputting data to a processor related to articles of clothing to which the service is to be performed by way of a touch screen mounted to be accessible on the outside of said building structure;
   b) providing a claim ticket including the input data and a unique code identifying the merchandise being dropped off printed thereon;
   c) providing the articles of clothing to which service is desired through a pick up bar accessible from outside of said building structure, said articles of clothing being inserted into a bag attached to a hanger which is picked up within said building and deposited on an automated pick up rack by said pick up bar at a location having a unique code associated with the unique code on said claim ticket;
   d) performing the desired service on the articles of clothing;
   e) positioning the articles of clothing on which service has been performed to a return rack at a position associated with the unique code printed on the claim ticket;
   f) providing the claim ticket to the processor;
   g) scanning the unique code on the claim ticket to determine the articles of clothing associated with the claim ticket and an amount due for performing the service;
   h) inputting payment due to the processor; and
   i) providing the serviced articles of clothing to the user upon receipt of the claim ticket and payment by way of a pick up window accessible from outside of said building structure, each serviced article of clothing being suspended from a hanger and transferred from said pick up rack to a delivery bar which is accessible to said user through said pick up window.

10. The method as recited in claim 9, wherein said data includes information concerning the articles of clothing being dropped off and a desired service to be performed on the articles of clothing.

11. The method as recited in claim 10, wherein said unique code is a bar code and said code is scanned by said processor.

12. The method as recited in claim 11, further comprising the step of monitoring the automatic drop off and pick up of merchandise on video.

13. The method as recited in claim 12, wherein said step of inputting payment due includes one of providing currency to the processor and providing a credit or debit card to the processor.

* * * * *